Aug. 2, 1949.  C. N. SUGDEN  2,478,022
METHOD OF MAKING SOCKET AND TUBE ASSEMBLIES
FOR BOURDON TUBE INSTRUMENTS
Filed Jan. 27, 1944  2 Sheets-Sheet 1
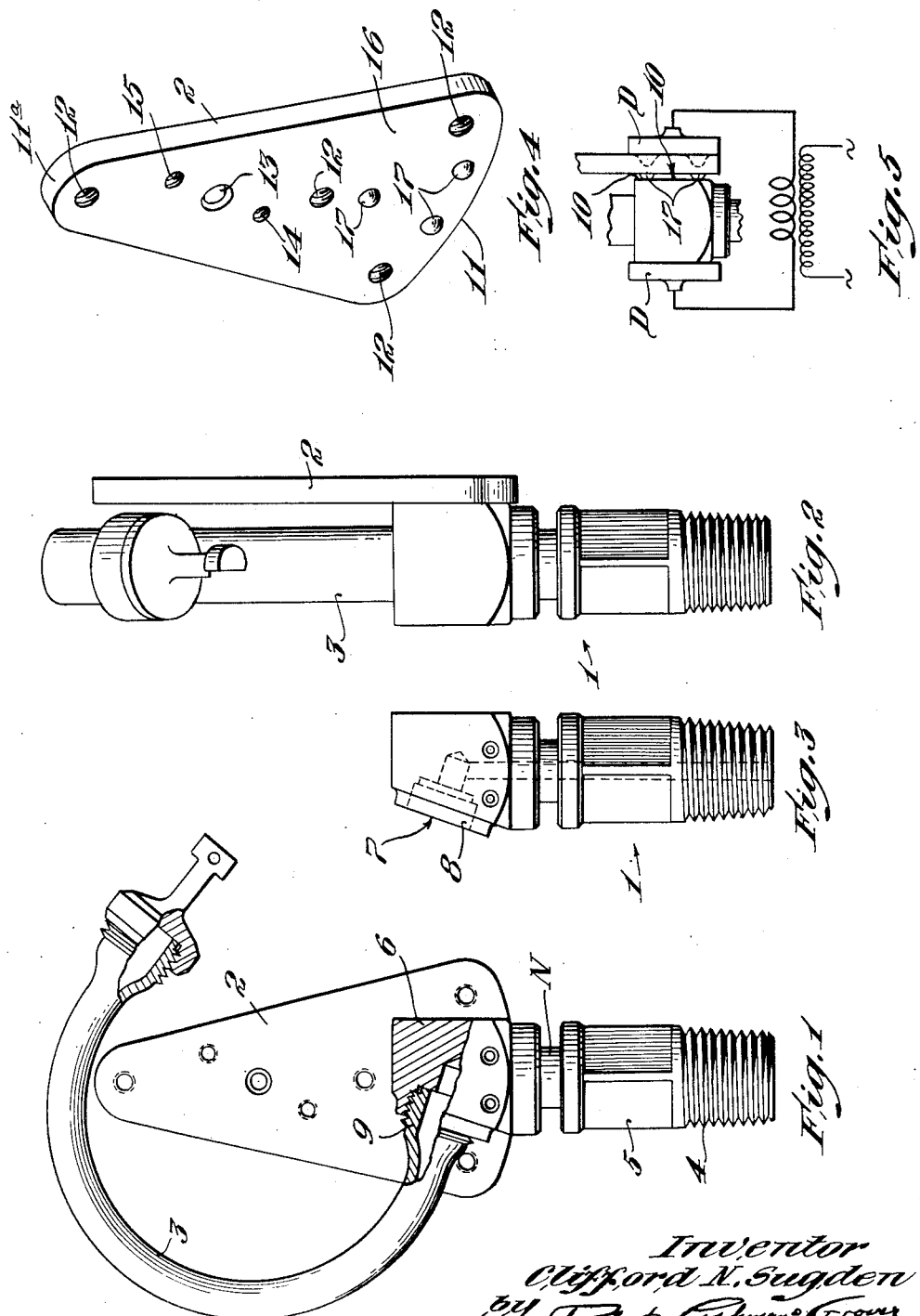
Inventor
Clifford N. Sugden
by Roberts Cushman & Grover
att'ys.

Aug. 2, 1949.                        C. N. SUGDEN                        2,478,022
              METHOD OF MAKING SOCKET AND TUBE ASSEMBLIES
                       FOR BOURDON TUBE INSTRUMENTS
Filed Jan. 27, 1944                                       2 Sheets-Sheet 2
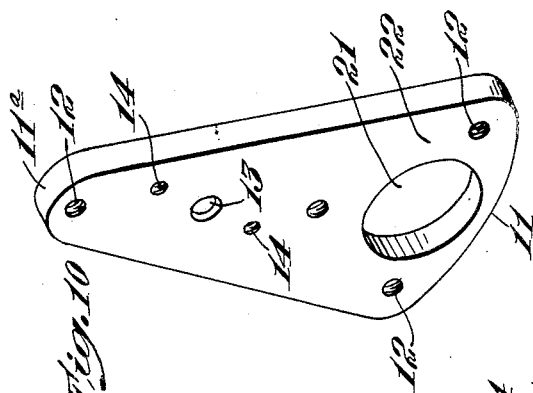
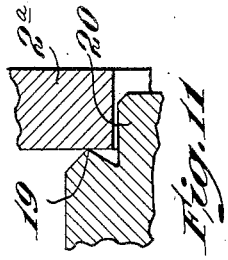
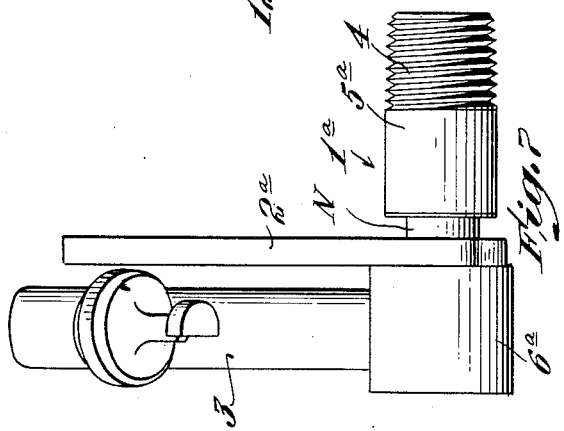
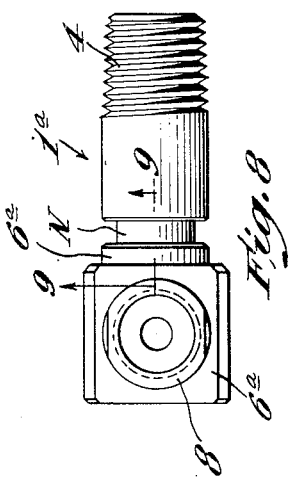
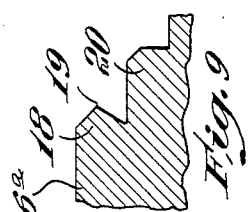
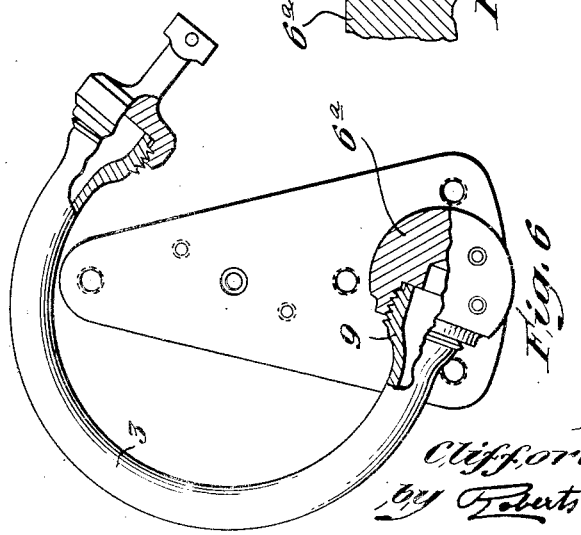
Inventor
Clifford N. Sugden
by Roberts Cushman & Grover
att'ys.

Patented Aug. 2, 1949

2,478,022

UNITED STATES PATENT OFFICE 2,478,022

METHOD OF MAKING SOCKET AND TUBE ASSEMBLIES FOR BOURDON TUBE INSTRUMENTS

Clifford N. Sugden, Bridgeport, Conn., assignor to Manning, Maxwell & Moore, Incorporated, New York, N. Y., a corporation of New Jersey Application January 27, 1944, Serial No. 519,869

4 Claims. (Cl. 29—148)

This invention relates to Bourdon tube dial instruments, for example pressure gauges, thermometers or the like, and more particularly to a novel method of making the socket portion of such an instrument and to a novel socket.

The "socket" is that portion of the instrument which supports the Bourdon tube, the movement mechanism and usually the instrument case, and to which the supply pipe is attached. The socket thus usually comprises a screw-threaded nipple portion for connection to the supply pipe, a hollow boss which receives the fixed end of the Bourdon tube and to which the tube is permanently joined by soldering, welding or brazing; a part or parts having openings (usually screw-threaded) to receive fasteners for attaching the instrument case to the socket, and a part (often more or less circular and commonly referred to as a "pad") having an accurately flat surface to which the movement frame is secured. The complete socket is thus necessarily of complicated shape and when made, as is customary, in one piece by casting, forging or die moulding, it is difficult and costly to produce in the rough, and must then undergo expensive machining operations to provide the necessary flat, smooth and properly located surfaces for the reception of the movement frame and for attachment to the instrument case. Moreover, in accordance with modern procedure the Bourdon tube is permanently secured to the socket by high temperature soldering, brazing or welding, but such operation is difficult to perform at the location of the usual recess which receives the end of the tube, due to the complexity of shape of the socket and the necessarily limited small size of the socket.

Attempts have heretofore been made to produce the socket as a unitary piece from bar stock, but this involves much costly machine work, and a great waste of material, and, in the production of some of the thinner parts, the removal of so much metal that the resultant internal strains tend to warp these thin parts and thus to throw the instrument out of alignment during use.

The present invention has for its principal object the provision of a novel method of making such an instrument socket whereby the above-noted difficulties are largely overcome, the cost of manufacture is reduced, the time involved is decreased as compared to that ordinarily required, the quality of the instrument is improved, and the range of materials which may be used in making the socket is greatly increased. Other and further objects and advantages of the invention will be pointed out in the following more detailed description and by reference to the accompanying drawings wherein Fig. 1 is a front elevation, with certain parts broken away and in section, showing a socket made in accordance with the improved process and having the Bourdon tube attached thereto, the socket being designed to enter the lower port of the instrument case, the instrument case and movement mechanism being omitted;

Fig. 2 is a side elevation of the parts shown in Fig. 1;

Fig. 3 is a side elevation of the stem portion of the socket in readiness for assembly with the frame supporting plate in accordance with the present invention;

Fig. 4 is a perspective view, to larger scale, of the frame-supporting plate before assembly with the stem;

Fig. 5 is a fragmentary vertical section showing the stem and plate assembled in readiness to be permanently united by projection welding;

Fig. 6 is a view similar to Fig. 1 but illustrating a socket designed to have the pipe connection at the rear of the instrument;

Fig. 7 is a side elevation of the assembled parts shown in Fig. 6;

Fig. 8 is a plan view of the stem portion of the socket before assembly with the other parts;

Fig. 9 is a fragmentary vertical section to large scale, substantially on the line 9—9 of Fig. 8, showing the special shape of the parts to facilitate projection welding;

Fig. 10 is a perspective view of the frame-supporting plate before assembly with the stem; and Fig. 11 is a fragmentary vertical section showing the stem and plate assembled and in readiness to be permanently united by projection welding.

Referring to the drawings, the numeral 1 designates the stem portion of the socket. This stem portion may be made in any desired way and of any appropriate material, but is conveniently formed from square bar stock, for example steel or bronze. The numeral 2 designates the frame-supporting plate, and the numeral 3 designates the Bourdon tube, the latter being of conventional type.

In Figs. 1, 2 and 3 the stem 1 is shown as provided with a screw-threaded nipple portion 4 for securing it to a conduit or pipe connection, and as having a portion 5 of substantially square transverse section for the convenient application of a wrench. The stem also comprises the head portion 6, here shown as united to the part 5 by a neck N (Fig. 1) of relatively small diameter. As shown in Fig. 3, the left-hand surface 7 of the head 6 is inclined to the vertical at an angle such that it is substantially perpendicular to the axis of that portion of the Bourdon tube (Fig. 1) which is secured to the head. The head 6 is provided with a recess 8 opening at this surface 7, the recess being internally screw threaded, if desired, for engagement with the screw-threaded end portion 9 of the Bourdon tube. Preferably, after assembly of the Bourdon tube and the head 6, they are permanently united, for example by high temperature soldering, brazing, welding, or similar process by which the parts are molecularly joined.

The rear surface 10 (Fig. 5) of the head 6, is substantially vertical and is smooth and substantially flat. If the bar stock from which the stem is made is square, this surface 10 may be the original surface of the stock and may need no other finishing than cleaning. However, this surface should in any event be flat, since it constitutes the contact face for engagement and union with the frame-supporting plate 2.

The plate 2, as shown in Figs. 1 and 4, is of substantially triangular contour, having the relatively wide base 11 and the relatively narrow apex portion 11a, its corners preferably being rounded. This plate is conveniently made from sheet stock of appropriate thickness, for example cold rolled steel having very smooth flat surfaces. By this novel method of procedure it is thus possible to make the stem and plate of different materials, each most appropriate for its particular function. In any event the plate 2 should be stiff and rigid so as to provide a secure support for the frame of the movement mechanism. As illustrated, the plate 2 is provided with an opening 12 in each corner portion, said openings being shown as screw threaded and being designed to receive fasteners by means of which the instrument case may be secured to the plate. The plate is also shown as furnished with openings 13, 14 and 15 at its central portion designed to receive positioning and fastening means for the movement frame. At its lower central portion, at least one side of the plate 2 is a smooth and flat surface 16 constituting a contact face for registry with the face 10 of the stem. Preferably, to facilitate union of the plate and stem in accordance with a preferred embodiment of the present invention, the surface 16 of the plate 2 is provided with a plurality (here shown as three) of integral projections or studs 17. These studs are conveniently formed by striking them up from the material of the plate, although care should be exercised in so forming these studs that the metal is not sheared or substantially weakened.

In assembling the parts, the Bourdon tube is first secured in the recess 8 of the stem and then permanently united to the stem in accordance with any preferred procedure. The supporting plate 2 is then assembled with the stem so that the surfaces 10 and 16 are in registry and with the studs or projections 17 of the plate contacting the surface 10. The stem and plate are then interposed between the dies D (Fig. 5) of a welding apparatus and subjected to pressure between the dies, while welding current is passed between the plate and stem. The welding current is concentrated at the studs 17, thus interfusing the materials of the plate and stem and thus producing a substantially instantaneous, permanent and reliable union between the plate and stem, whereby the plate and stem are molecularly and rigidly united. This fusion welding may be performed very rapidly and in fact so quickly that the body of the stem does not become sufficiently heated during the process to injure the Bourdon tube or substantially affect the resiliency of the latter.

While the studs or projections 17 are most conveniently formed upon the plate 2, it is contemplated that they may, if desired, be formed on the head 6 of the stem or upon both of these parts if preferred.

In Figs. 6 to 11 a modified procedure is illustrated whereby the socket is provided with a stem portion designed to extend through the rear wall of the instrument case. In these views the stem 1a is shown as comprising the screw-threaded nipple portion 4, the body portion 5a which may be shaped to accommodate a wrench or which may be round, as shown in Figs. 7 and 8, the head portion 6a, and the connecting neck portion N. The head portion 6a is furnished with a recess 8 (Fig. 8) in its peripheral surface, for the reception of the end portion 9 of the Bourdon tube 3. The right-hand surface of the head 6a, as viewed in Fig. 9 has an annular rib 18 coaxial with the nipple portion 4 of the stem, and which is shaped to provide the sharp edge 19 disposed in a plane perpendicular to the axis of the nipple portion of the stem. Between the rib 18 and the neck portion N there is a circular portion 20 of a diameter slightly greater than that of the neck portion. The supporting plate 2a is formed of sheet material and is of the same general contour and arrangement as the plate 2 above described, having openings 12, 13, 14 and 15, for the reception of fasteners. However, instead of the contact surface 16 of plate 2, as previously described, the plate 2a is furnished with a relatitvely large opening 21 in this portion, such opening being of a diameter such as to permit the portions 4 and 5a of the stem to pass through this opening, the part 20 of the stem fitting loosely within the opening so that when concentrically arranged, the wall of opening 2 does not contact part 20. The surface 22 of the plate 2a bordering the opening is flat and smooth and constitutes a contact surface for engagement with the edge 19 of the rib 18 of the stem.

In assembling the parts, the end 9 of the Bourdon tube 3 is disposed in the recess 8 and the stem and tube are then permanently united. The nipple portion 4 of the stem is then passed through the opening 21 of the plate 2a and the latter is moved longitudinally of the stem until it embraces the part 20 of the stem and until the surface 22 contacts the edge 19 of the rib 18. The stem is arranged concentrically with opening 21 and the parts are interposed between the dies D of a welding apparatus and current is caused to pass between the plate 2a and the rib 18 of the stem. The rib 18 acts as a projection to concentrate the current so that the contacting parts are almost instantly interfused to form an annular weld between the stem and a plate, permanently and securely uniting the plate to the stem with the plate in a plane substantially perpendicular to the axis of the stem.

While certain desirable embodiments of the invention have herein been illustrated and described by way of example, it is to be understood that the invention is broadly inclusive of such variations and substitutions of equivalents as fall within the terms of the appended claims.

I claim:
1. That method of making a socket and tube assembly for a Bourdon tube instrument which comprises as steps fabricating from bar stock a stem having a screw-threaded nipple portion, a part designed for the application of a wrench and a head portion united to said latter part by a neck of smaller diameter than the nipple portion, the stem having therein a fluid passage and the head having a substantially vertical face, preparing a frame-supporting plate from rigid sheet material, providing a Bourdon tube, assembling the Bourdon tube with the stem and molecularly uniting the end of the tube to the stem, assembling the plate with the stem so that one face of the plate is juxtaposed to said vertical face of the stem head, and interfusing the plate with the stem, the fusing operation being performed so rapidly that the Bourdon tube is not injured by the fusing heat.

2. That method of making a socket and tube assembly for Bourdon tube instruments which comprises as steps preparing a unitary elongate stem comprising a nipple portion for uniting it to a pipe connection, a portion for engagement with one end of a Bourdon tube, and a substantially flat contact surface in a plane parallel to the axis of the nipple portion, forming from sheet material, different from that of the stem, a frame-supporting plate, providing said plate with openings for fasteners for uniting the instrument case and movement frame to the plate, the plate having a contact surface designed to register with the contact surface of the stem, striking up spaced projections at the contact surface of the plate, assembling and permanently uniting the tube and stem, so assembling the plate and stem that their contact surfaces are in registry and with the projections of the plate engaging the stem, and fusion-welding the projections of the plate to the stem, the welding operation being performed in so short a time that the welding heat does not injure the Bourdon tube.

3. That method of making a socket and tube assembly for Bourdon tube instruments which comprises as steps preparing from bar stock a unitary stem comprising an attaching portion for uniting it to a pipe connection and a head portion having a screw-threaded recess for the reception of the stationary end of the Bourdon tube, the head portion also having a substantially vertical contact surface for engagement with a movement supporting plate, providing a generally triangular movement supporting plate of stiff, rigid sheet material, the plate having openings in its corners for the reception of fasteners for attaching it to an instrument case, and also having openings at its medial portion for the reception of fasteners for uniting it to the movement frame, providing a Bourdon tube having a screw-threaded end, screw threading said latter end of the tube into the recess in the stem and thereafter molecularly uniting the tube and stem, thereafter assembling the stem and plate so that the medial part of the wider portion of the plate is substantially parallel to and registers with said contact surface of the stem, and interfusing the material of the plate and stem, the fusing operation being carried out so rapidly that the tube is uninjured by the fusing heat.

4. That method of making a socket and tube assembly for Bourdon tube instruments which comprises as steps providing a unitary elongate stem having a nipple portion for uniting it to a supply conduit, a portion for engagement by the fixed end of a Bourdon tube, and an annular angular rib coaxial with the nipple portion and with its edge in a plane perpendicular to the axis of the nipple portion, forming from sheet material, different from that of the stem, a frame-supporting plate, providing the plate with openings for the reception of fasteners whereby a movement frame may be secured to the plate, providing the plate with a relatively larger opening of a diameter such as to permit the nipple portion of the stem to be passed through it without contact with the plate, assembling the Bourdon tube with the stem and permanently uniting it thereto, passing the nipple portion of the stem through the larger opening in the plate and disposing the stem concentrically with the opening, causing that portion of the plate which borders the opening to bear against the annular rib of the stem, and fusion-welding said annular rib to the plate, the welding operation being performed in so short an interval of time that the resiliency of the Bourdon tube is unaffected by the welding heat.

CLIFFORD N. SUGDEN.

REFERENCES CITED

The following references are of record in the file of this patent:

UNITED STATES PATENTS

| Number | Name | Date |
| --- | --- | --- |
| 881,764 | Arnold, Jr. | Mar. 10, 1908 |
| 1,460,928 | Tilden | July 3, 1923 |
| 1,902,931 | Zubaty | Mar. 28, 1933 |
| 2,005,205 | Rix | June 18, 1935 |
| 2,040,681 | Baker | May 12, 1936 |
| 2,162,477 | Cox | June 13, 1939 |
| 2,276,050 | Leighton | Mar. 10, 1942 |
| 2,278,708 | Miller | Apr. 7, 1942 |
| 2,309,666 | Parker | Feb. 2, 1943 |
| 2,320,993 | Worner | June 8, 1943 |
| 2,372,772 | Ellis et al. | Apr. 3, 1945 |

OTHER REFERENCES

Pp. 230–231, Weld. Encyclo., 9th ed., pub. by Weld. Eng. Pub. Co., Chicago, Ill.